Figure 1:
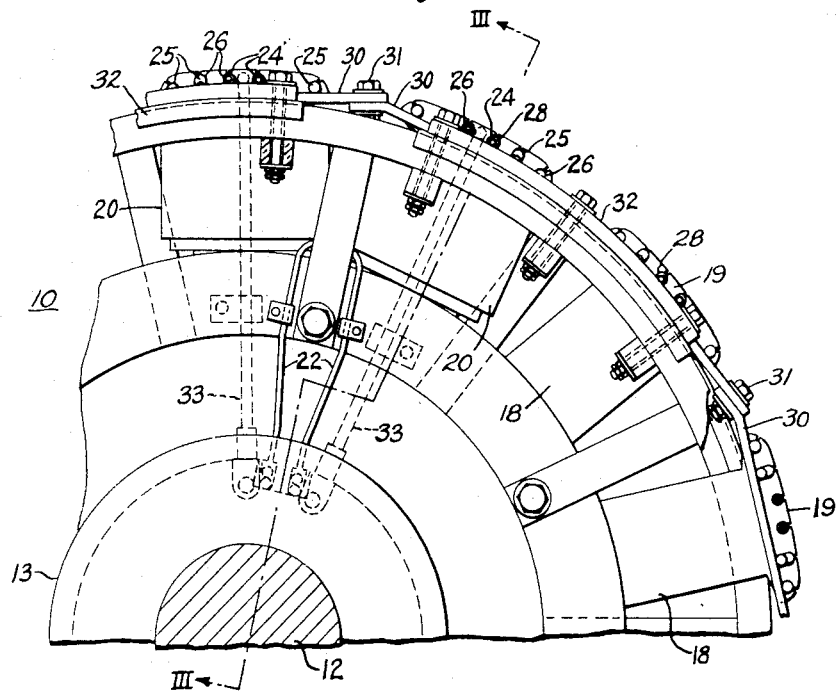

May 15, 1934.  C. C. SHUTT  1,958,903

SELF STARTING POLYPHASE SYNCHRONOUS MOTOR

Filed Aug. 5, 1933  2 Sheets-Sheet 1

WITNESSES:

INVENTOR
Charles C. Shutt.
BY
ATTORNEY

May 15, 1934.  C. C. SHUTT  1,958,903
SELF STARTING POLYPHASE SYNCHRONOUS MOTOR
Filed Aug. 5, 1933    2 Sheets-Sheet 2
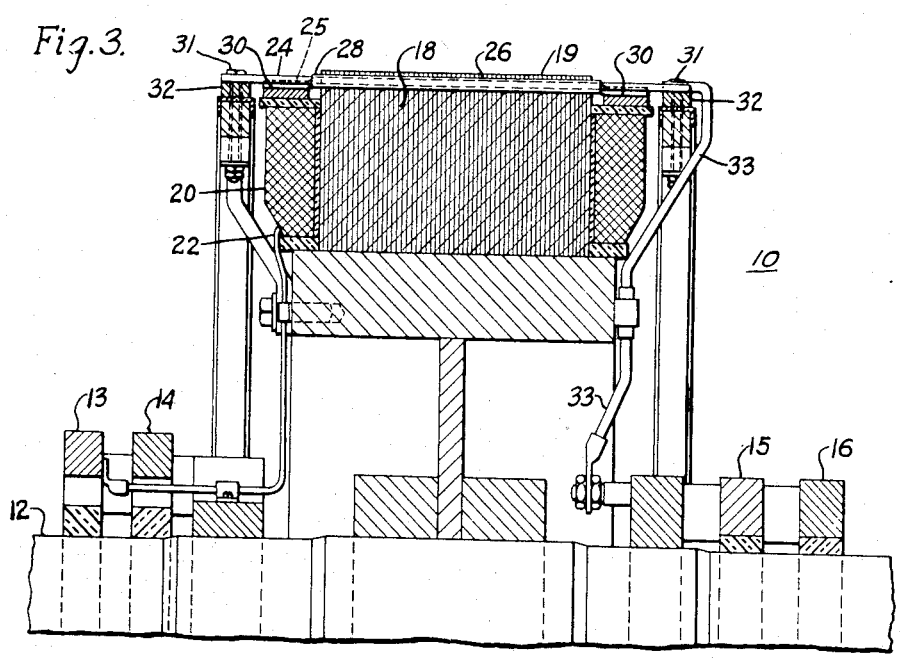
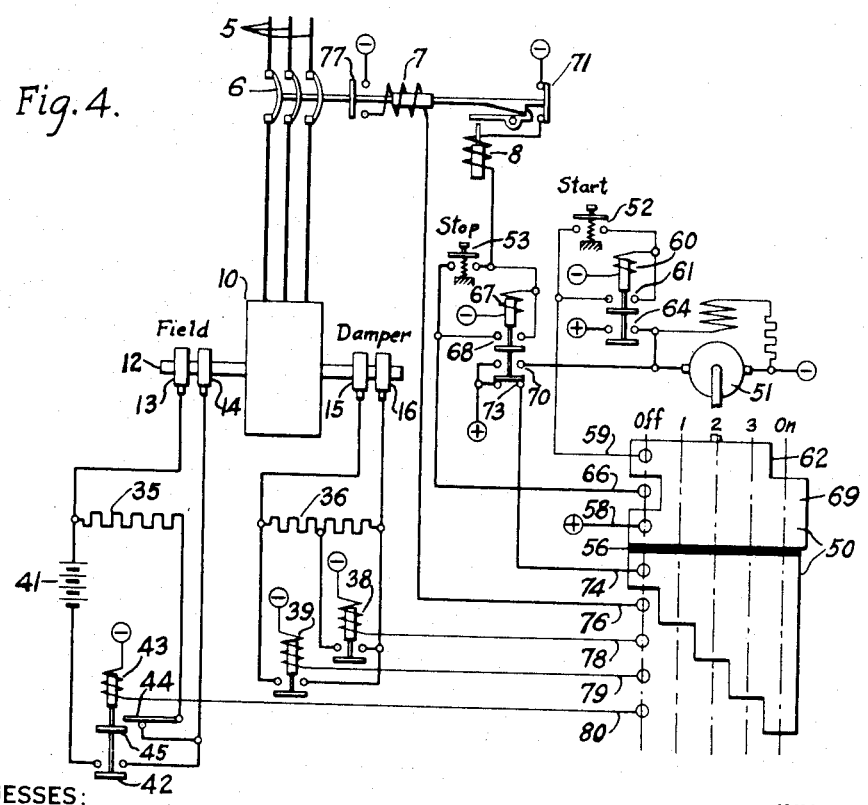
WITNESSES:
INVENTOR
Charles C. Shutt.
BY
ATTORNEY Patented May 15, 1934

1,958,903

UNITED STATES PATENT OFFICE 1,958,903

SELF-STARTING POLYPHASE SYNCHRONOUS MOTOR

Charles C. Shutt, Wilkinsburg, Pa., assignor to Westinghouse Electric & Manufacturing Company, East Pittsburgh, Pa., a corporation of Pennsylvania Application August 5, 1933, Serial No. 683,767

12 Claims. (Cl. 172—280)

My invention relates to heavy-duty self-starting polyphase synchronous dynamo-electric machines, particularly large motors for power service.

The principal object of my invention is to provide a low-cost synchronous motor which is capable of giving reasonably good starting-performance at a low price and with very inexpensive control apparatus. This object is attained by a special construction of the damper winding and by a special control system therefor, as hereinafter described and claimed, and illustrated in the accompanying drawings, wherein Figure 1 is a fragmentary end elevation of a rotating field member of a motor embodying my invention, with parts broken away to show the construction, Fig. 2 is a view showing a development of the damper windings of a portion of the field member, Fig. 3 is a transverse longitudinal sectional view through the rotor member shown in Figure 1, the section plane being indicated by the line III—III in Figure 1, and Fig. 4 is a diagrammatic view of circuits and apparatus showing the electrical connections in a preferred form of embodiment.

As indicated in Figure 4, my invention relates particularly to large polyphase motors such as are supplied from a three-phase line 5 through a circuit breaker 6 having a closing coil 7 and a trip coil 8. The motor is indicated in its entirety by the numeral 10 in Fig. 4, and it comprises a stator member having a three-phase armature winding and a rotating field member which is mounted on a shaft 12 and which carries two sets of collector rings 13, 14 and 15, 16.

Figure 2:
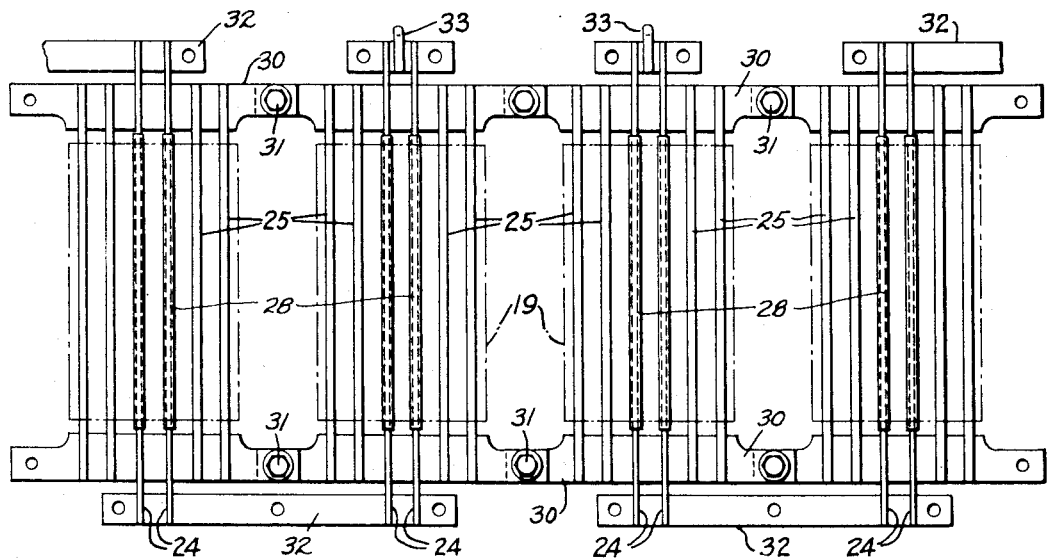

The construction of the rotating field member will be clearer from Figs. 1 and 3, from which it will be apparent that it is of salient-pole construction, having, in the case illustrated, fourteen poles, each pole consisting of a magnetizable pole piece 18, said pole piece having a pole face or shoe 19 and being embraced by a field coil 20. It will be understood that the field coils 20 are all connected together electrically so as to be energized together, through field leads 22 which are connected to the collector rings 13 and 14.

For synchronous machines having any material amount of starting torque, it is particularly necessary to utilize some sort of damper winding. My invention includes the use of a special form of damper winding which consists of a plurality of bars 24 and 25 which are disposed in slots 26 in the pole faces 19. Two different kinds of bars are utilized. The centrally disposed bars 24 in each pole face are of insulated copper rods, that is, highly conductive rods or bars having a thin wrapping of insulating material 28 (Figs. 1 and 3) covering the portions of the bars which lie within the slots 26 of the pole faces. The other bars 25 of the damper winding are bare or uninsulated, and are of some high-resistance material such as everdur, which is a bronze having a resistivity of about seventeen times that of copper.

The high-resistance bars 25 are shorter than the centrally disposed low-resistance bars 24, and their ends are brazed to damper segments 30 which are joined together as indicated at 31 to form end rings for joining the high-resistance bars in squirrel-cage fashion. Since these high-resistance bars constitute a squirrel-cage secondary member, it is not generally necessary to insulate the portions of the bars which lie within the rotor slots 26.

The centrally disposed low-resistance bars 24 in the several pole shoes are connected in a very special manner, being joined in series from one pole to the next by means of segmental end-connectors 32 to which the bars 24 are soldered, forming a sort of zig-zag winding around the machine, so that the circuit extends forward across the center of one pole shoe, and back across the center of the next adjacent pole shoe, and then forward across the center of the next adjacent pole shoe, and so on around the field member, terminating in two damper-winding leads 33 (Fig. 3) which are electrically connected to the two collector rings 15 and 16, respectively. I prefer to place the bars 24 of this zig-zag damper-winding circuit in the centers of the pole faces, so that the fluxes produced by the currents induced in this single-phase zig-zag winding, at starting, shall be in space-quadrature with the poles of the field winding 20, so that the zig-zag winding and the field winding may be effectively utilized as the equivalent of a low-resistance two-phase secondary motor winding in the last stages of the starting operation, to assist very materially in bringing the motor up to a speed sufficiently close to synchronous speed to permit it to fall into step when the field winding is finally excited with direct current, as will now be explained.

The electrical connections of my motor, with an exemplary control equipment, are shown in Figure 4. It will be understood that when the motor is not in use, it is disconnected from the line 5 by the opening or tripping of the circuit breaker 6. Under these conditions, it is necessary to have both the field winding and the zig-zag damper winding closed-circuited through resistors 35 and 36, respectively, so that the motor will be ready to start. The field winding can either be closed-circuited, as an entirety, by the resistor 35 which is connected externally by means of the collector rings 13 and 14, or the field winding may be sub-divided into a plurality of circuits, as is well known, in order to limit the total voltage induced in the winding at the first moment of starting. This voltage must be limited to a value which can be withstood safely by the insulation on the field winding, and if the cost is to be kept low, as in my invention, the amount of field-winding insulation, and hence the permissible induced voltage, will neither one be excessive.

The first step in the operation of my motor is the closing of the circuit breaker 6. When this happens, the motor starts up with a torque which is produced largely by the damper winding. The external resistor 36 which is utilized to complete the circuit of the zig-zag damper-winding circuit is of such high resistance as to give approximately the same effect as if the entire damper winding were of normal type with all bars of high resistance. The short-circuited field winding, including the external resistor 35, also contributes to the starting torque.

While the motor is accelerating, the resistor 36 is cut out, in one or more steps, as by means of electro-magnetic relays 38 and 39, until, at around 90% speed, the series zig-zag damper-winding circuit consists only of the copper-bar winding, short-circuited across the collector rings 15 and 16. This constitutes a low-resistance single-phase secondary winding which cooperates, under these conditions, with the field winding, as previously pointed out, to accelerate the motor to a speed sufficiently high to admit of synchronization. The discharge resistor 35 in series with the field winding is relatively small, when reduced to an equivalent circuit making allowance for the large number of turns of the field winding, so that, under these circumstances, the field winding operates as a closed-circuit, low-impedance, single-phase secondary winding. This condition differs from that of which prevails at the first moment of starting, when the high reactance of the field winding causes the latter to have a much higher impedance, due to the relatively high frequency of the currents which are induced therein at standstill.

The last step in the starting of the motor 10 is to apply a direct-current excitation to the field-winding collector rings 13 and 14, from a suitable source such as a battery 41, by means of switching contacts 42 on a relay 43. As soon as the direct-current circuit is completed, the field-discharge resistor 35 is cut out by means of an auxiliary switch 44 which is opened by being struck by a collar 45 carried by the relay 43.

The operation of the steps just described may be, and generally are, carried out automatically, as in the pushbutton control system shown in Fig. 4 and comprising a drum controller 50 which is driven by a small pilot-motor 51 under the control of start and stop pushbuttons 52 and 53. The drum controller 50 is illustrated as being divided into two portions separated by an insulator 56, the upper portion controlling the movement of the drum, and the lower portion controlling the operation of the main motor 10.

The movement of the drum is so controlled that, when the "start" pushbutton 52 is depressed, the drum will rotate around until it reaches its "on" position, whereupon it will automatically stop, and also so that when the "stop" pushbutton 53 is depressed, the drum will rotate until it rests in its "off" position. The circuits for these operations can be traced from the positive lead 58 at the drum, to a conductor 59 leading to the "start" pushbutton 52, thus energizing a "start" relay 60 which picks up and seals itself in, at 61, so that it remains energized until the top segment 62 of the drum rides off of the terminal contact 59. As long as the "start" relay 60 remains energized, it maintains an energizing circuit for the pilot motor 51, by means of main contacts 64 carried by the relay.

The movement of the drum to the "off" position is effected by means of a circuit which may be traced from the positive lead 58 at the drum, through a conductor 66 which leads to the "stop" pushbutton 53, thereby completing a circuit to a "stop" relay 67 which seals itself in, at 68, and remains closed as long as the second segment 69 of the drum is in contact with the terminal lead 66. As long as the "stop" relay remains energized, it maintains a circuit through the pilot motor 51 through main contacts 70 on the relay.

When the "stop" pushbutton 53 is depressed, it not only energizes the "stop" relay 67 as above described, but it also energizes the trip coil 8 of the circuit breaker 6, so as to instantly disconnect the main motor 10 from its source of supply 5. The current through the trip coil 8 is finally interrupted by means of a back contact 71 on the circuit breaker 6.

A depression of the "stop" pushbutton 53 also serves to open a safety circuit for the bottom half of the drum controller 50, which is accomplished by means of the "stop" relay 67 which has back contacts 73 thereon, said contacts being closed when the relay is deenergized and open when the relay is energized. These back contacts 73 of the "stop" relay 67 serve to energize the positive terminal supply lead 74 of the lower half of the drum controller 50 at all times except when the stop relay 67 is actuated. The purpose of this will be explained hereinafter.

It will be understood that the drum controller 50 is arranged, in a plurality of steps or positions, to effect the several necessary control operations in the order in which they are desired. The pilot motor 51 drives the drum at a uniform rate of speed, a development of the drum being indicated on the drawing, the drum moving successively from its "off" position to intermediate positions 1, 2 and 3 and thence to the "on" position, and finally one step further, at which it completes its revolution, coming again on its "off" position. The speed of the motor, and the circumferential spaces between its several intermediate positions 1, 2 and 3, are so chosen as to give the necessary or desired time intervals. No effort has been made to indicate the relative time intervals on the drawings, which are entirely schematic.

When the controller is in its first intermediate position indicated by the numeral 1, it completes a circuit from the positive conductor 74 to the terminal lead 76 which energizes the closing coil 7 of the circuit breaker 6 and thus starts the main motor 10. The current through the closing coil is finally interrupted by auxiliary contacts 77 carried by the circuit breaker 6.

In the second intermediate position 2 of the drum controller 50, the terminal conductor 78 is energized, thereby energizing the relay 38 which short-circuits part of the damper-winding resistor 36.

In the third intermediate position 3 of the drum controller, the terminal conductor 79 is energized and thus energizes the relay 39 which short-circuits all of the damper-winding resistor 36.

In the "on" position of the drum controller, the terminal 80 is energized and thus energizes the relay 43 which first connects the battery 41 to the field-winding collector rings 13, 14 and then, immediately afterwards, at the close of the movement of the relay, trips the switch 44 which disconnects the field-discharge resistor 35.

It will now be apparent that the purpose of the auxiliary back contact 73 on the "stop" relay 67 is to ensure that the closing coil 7 is deenergized and that the field-exciting relay 43 is deenergized, instantly upon the depression of the "stop" button 53. This not only permits the circuit breaker to be safely opened instantly, when the drum controller is at its "on" position, but it also permits the circuit breaker to be tripped instantly, even while the drum controller is in motion, as when an operator starts the main motor 10 and then wishes to stop it before it has attained full speed. The auxiliary stop-relay contact 73, in such an event, instantly kills all control circuits of the main motor 10, while the second segment 69 of the drum controller serves to keep the stop relay 67 energized until the drum controller returns to its "off" position.

It will be understood that any suitable means of control may be utilized, either automatic or manual, and that if the expense of the complication is justified, the field-discharge resistor 35 may be automatically changed, during the starting process, either instead of the damper-winding resistor 36 being changed, or in addition thereto.

The zig-zag winding connection of the centrally disposed low-resistance damper bars 24 is clearly indicated in Fig. 2, wherein the zig-zag circuit may be traced from one of the damper-winding leads 33, for instance the right-hand lead, at the rear end of the machine, passing forwardly through the bars 24 on the third pole face 19, thence to the segmental end-connector 32 in the front of the machine and over to the bars 24 of the fourth pole face since the circuit passes rearwardly to the segmental end-connector 32 at the rear of the machine, and so on. While I have shown two centrally disposed, low-resistance bars in each pole face 19, it will be understood that only one, or more than two, of these low-resistance bars may be utilized, if desired.

The foregoing and other changes will be obvious to those skilled in the art, and may be made without departing from the spirit of my invention. I desire, therefore, that the appended claims shall be accorded the broadest construction consistent with their language when read in conjunction with the prior art.

I claim as my invention:

1. A heavy-duty self-starting polyphase synchronous dynamo-electric machine characterized by having a salient-pole field member having a field winding comprising coils surrounding the pole pieces and a damper winding comprising bars disposed in the pole shoes, said damper winding comprising two distinct portions, one portion comprising the centrally disposed bars in the several pole shoes and the second portion comprising the remaining bars, end rings for joining the bars of the second portion in squirrel-cage fashion, and end connectors for joining the bars of the first portion in zig-zag fashion so that the circuit extends forward across the center of one pole shoe, and back across the center of the next adjacent pole shoe, then forward across the center of the next adjacent pole shoe, then forward across the center of the next adjacent pole shoe, and so on, around the field member.

2. The invention as recited in claim 1, characterized by means including resistors for close-circuiting said field winding and said zig-zag damper-winding portion, respectively, means for energizing said motor with said resistors in circuit with their respective windings, means for subsequently reducing at least one of said resistors during the acceleration of the machine, and means for supplying unidirectional-current excitation to said field winding when the machine has attained nearly synchronous speed.

3. The invention as recited in claim 1, characterized by means including resistors for close-circuiting said field winding and said zig-zag damper-winding portion, respectively, means for energizing said motor with said resistors in circuit with their respective windings, means for subsequently reducing the resistor in said zig-zag damper-winding portion during the acceleration of the machine, and means for supplying unidirectional-current excitation to said field winding when the machine has attained nearly synchronous speed.

4. A heavy-duty self-starting polyphase synchronous dynamo-electric machine characterized by having a salient-pole field member having a field winding comprising coils surrounding the pole pieces and a damper winding comprising bars disposed in the pole shoes, and end connectors for joining the bars in zig-zag fashion so that the circuit extends forward across one pole shoe, and back across the next adjacent pole shoe, then forward across the next adjacent pole shoe, and so on, around the field member.

5. The invention as recited in claim 4, characterized by means including resistors for close-circuiting said field winding and said damper winding, respectively, means for energizing said motor with said resistors in circuit with their respective windings, means for subsequently reducing at least one of said resistors during the acceleration of the machine, and means for supplying unidirectional-current excitation to said field winding when the machine has attained nearly synchronous speed.

6. The invention as recited in claim 4, characterized by means including resistors for close-circuiting said field winding and said damper winding, respectively, means for energizing said motor with said resistors in circuit with their respective windings, means for subsequently reducing the resistor in said zig-zag damper winding during the acceleration of the machine, and means for supplying unidirectional-current excitation to said field winding when the machine has attained nearly synchronous speed.

7. A heavy-duty self-starting polyphase synchronous dynamo-electric machine characterized by having a salient-pole field member having a field winding comprising coils surrounding the pole pieces and a damper winding comprising centrally disposed insulated low-resistance bars in the several pole shoes, flanked, on each side by bare high-resistance bars, end rings for joining the high-resistance bars in squirrel-cage fashion, and end connections for joining the low-resistance bars in zig-zag fashion so that the circuit extends forward across the center of one pole shoe, and back across the center of the next adjacent pole shoe, then forward across the center of the next adjacent pole shoe, and so on, around the field member.

8. The invention as recited in claim 7, characterized by means including resistors for close-circuiting said field winding and said zig-zag damper-winding portion, respectively, means for energizing said motor with said resistors in circuit with their respective windings, means for subsequently reducing at least one of said resistors during the acceleration of the machine, and means for supplying unidirectional-current excitation to said field winding when the machine has attained nearly synchronous speed.

9. The invention as recited in claim 7, characterized by means including resistors for close-circuiting said field winding and said zig-zag damper-winding portion, respectively, means for energizing said motor with said resistors in circuit with their respective windings, means for subsequently reducing the resistor in said zig-zag damper-winding portion during the acceleration of the machine, and means for supplying unidirectional-current excitation to said field winding when the machine has attained nearly synchronous speed.

10. The invention as recited in claim 7, characterized by means including a resistor external of the winding for close-circuiting said zig-zag damper-winding portion to give approximately the same effect as if the damper winding were of normal type with all bars of high resistance, means for limiting the voltage in the field winding at starting, means for starting the machine with both of the previously mentioned means in service, means operable during the acceleration of the machine for causing both the field winding and the zig-zag damper-winding portion to be closed-circuited through relatively low-impedance external circuit-connections, and means for supplying unidirectional-current excitation to said field winding when the machine has attained nearly synchronous speed.

11. A heavy-duty self-starting polyphase synchronous dynamo-electric machine characterized by having a salient-pole field member having a field winding comprising coils surrounding the pole pieces and a damper winding comprising two kinds of bars, one of low resistance and the other of high resistance, in each pole face, end rings for joining the high-resistance bars in squirrel-cage fashion, and end connections for joining the low-resistance bars in series from one pole to the next, clear around the field member, with two leads for circuit-connections external of said damper winding.

12. The invention as recited in claim 11, characterized by means including an external resistor for close-circuiting said series damper-bar circuit, so as to give approximately the same effect as if the damper winding were of normal type with all bars of high resistance, means for limiting the voltage in the field winding at starting, means for starting the machine with both of the previously mentioned means in service, and means for finally operating the machine with unidirectional-current excitation on said field winding and with said external resistor short-circuited.

CHARLES C. SHUTT.